(12) United States Patent
Matsunaga et al.

(10) Patent No.: US 11,976,947 B2
(45) Date of Patent: May 7, 2024

(54) TRANSDUCER, LOOSENING DETECTION SYSTEM AND LOOSENING DETECTION METHOD

(71) Applicant: Nippon Telegraph and Telephone Corporation, Tokyo (JP)

(72) Inventors: Eri Matsunaga, Musashino (JP); Masahito Nakamura, Musashino (JP); Tadashi Minotani, Musashino (JP); Masayuki Tsuda, Musashino (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 303 days.

(21) Appl. No.: 17/629,225

(22) PCT Filed: Jul. 26, 2019

(86) PCT No.: PCT/JP2019/029394
§ 371 (c)(1),
(2) Date: Jan. 21, 2022

(87) PCT Pub. No.: WO2021/019595
PCT Pub. Date: Feb. 4, 2021

(65) Prior Publication Data
US 2022/0268599 A1 Aug. 25, 2022

(51) Int. Cl.
*G01D 5/14* (2006.01)
(52) U.S. Cl.
CPC ........................... *G01D 5/14* (2013.01)

(58) Field of Classification Search
CPC ....... G01D 5/14; F16B 2200/93; F16B 31/02; G01L 5/00; G01M 13/00
See application file for complete search history.

(56) References Cited

U.S. PATENT DOCUMENTS

| | | | |
|---|---|---|---|
| 2007/0205776 A1* | 9/2007 | Harish ...................... | G01G 7/06 324/662 |
| 2014/0080409 A1* | 3/2014 | Frankland ............... | H02J 50/80 455/41.1 |
| 2014/0129158 A1* | 5/2014 | Shea ........................ | G01L 1/142 702/57 |
| 2022/0228996 A1* | 7/2022 | Matsunaga ............ | G01N 22/00 |

OTHER PUBLICATIONS

Xiangxiong Kong et al., *Image Registration-Based Bolt Loosening Detection of Steel Joints*, Sensors, vol. 8, No. 4, 2018, https://doi.org/10.3390/s18041000, pp. 1-21.

* cited by examiner

*Primary Examiner* — Suman K Nath
(74) *Attorney, Agent, or Firm* — Workman Nydegger

(57) ABSTRACT

A transducer includes a conductive sheet installed on a sheath of a cable, an insulative sheet installed on the conductive sheet, holes being formed in predetermined positions of the insulative sheet, and a conductive sheet installed on the insulative sheet, holes being formed in predetermined positions of the conductive sheet. The transducer has structure in which, when the cable is tightened by the screw from the top of the conductive sheet and fixed, the distal end of the screw comes into contact with the conductive sheet passing through the holes formed in the insulative sheet and the conductive sheet, and the conductive sheet and the conductive sheet are electrically connected.

12 Claims, 17 Drawing Sheets

TRANSDUCER, LOOSENING DETECTION SYSTEM AND LOOSENING DETECTION METHOD

TECHNICAL FIELD

The present invention relates to a transducer, a loosening detection system, and a loosening detection method.

BACKGROUND ART

Screws and bolts are objects having spiral grooves used for tightening components and are used in various uses ranging from large equipment such as infrastructural constructions and plant equipment to familiar products such as vehicles, play equipment, and furniture. In bolt joining parts, loosening and falling sometimes occur because of deterioration such as plastic deformation or fatigue due to vibration or excessively large force. As a result, injury accidents and the like due to bridge collapse and collapse accidents, leaks of gas and liquid from joining parts, cutting of axles of roller coasters, and dropping of bolts from high places are likely to occur. In order to solve such problems, there are a method of marking bolts and inspecting deviation from counter marks visually or with a camera and a hammering test.

CITATION LIST

Non-Patent Literature

Non-Patent Literature 1: Xiangxiong Kong and Jian Li, Image Registration-based bolt loosening detection of steel joints. Sensors. 2018, MDPI, vol 18(4), 1000], Internet <URL: https://doi.org/10.3390/s18041000>

SUMMARY OF THE INVENTION

Technical Problem

However, the method of marking bolts and inspecting deviation from counter marks visually or with a camera and the hammering test are not suitable for dead zones, dark places, and distant places where visual inspections are difficult. For example, as communication equipment, there are equipment having a lot of dead zones such as bridge attaching equipment and steel towers and equipment including concealed parts such as manholes, handholes, and closures. Usually, visual inspections are mainly performed for these kinds of equipment. The inspection is difficult for non-experts. There are large individual differences in inspection results.

The present invention has been devised in view of the above circumstances, and an object of the present invention is to provide a transducer, a loosening detection system, and a loosening detection method capable of remotely easily detecting that loosening, falling, and the like of screws for fixing a cable have occurred.

Means for Solving the Problem

A transducer according to an aspect of the present invention includes: a first conductive layer installed on a sheath of a cable; an insulative layer installed on the first conductive layer, a hole being formed in a predetermined position of the insulative layer; and a second conductive layer installed on the insulative layer, a hole being formed in a predetermined position of the second conductive layer. The transducer has structure in which, when the cable is tightened by a screw from a top of the second conductive layer and fixed, the distal end of the screw comes into contact with the first conductive layer passing through holes formed in the insulative layer and the first conductive layer, and the first conductive layer and the second conductive layer are electrically connected.

A loosening detection system according to an aspect of the present invention is a system including: a transducer; and a detection device that detects loosening of a screw using the transducer. The transducer includes: a first conductive layer installed on a sheath of a cable; an insulative layer installed on the first conductive layer, a hole being formed in a predetermined position of the insulative layer; and a second conductive layer installed on the insulative layer, a hole being formed in a predetermined position of the second conductive layer. The transducer has structure in which, when the cable is tightened by the screw from a top of the second conductive layer and fixed, the distal end of the screw comes into contact with the first conductive layer passing through holes formed in the insulative layer and the first conductive layer, and the first conductive layer and the second conductive layer are electrically connected. The detection device includes: a learning unit that, in a state in which the cable is tightened by the screw from the top of the second conductive layer and fixed, applies an AC voltage to the first conductive layer and the second conductive layer, measures a resonance characteristic, and learns, as an initial state, a resonance characteristic in a state in which the screw is tightened; and a detection unit that observes fluctuation from the initial state and detects loosening of the screw.

A loosening detection method according to an aspect of the present invention is a method in which a detection device detects loosening of a screw using a transducer. The transducer includes: a first conductive layer installed on a sheath of a cable; an insulative layer installed on the first conductive layer, a hole being formed in a predetermined position of the insulative layer; and a second conductive layer installed on the insulative layer, a hole being formed in a predetermined position of the second conductive layer. The transducer has structure in which, when the cable is tightened by the screw from a top of the second conductive layer and fixed, the distal end of the screw comes into contact with the first conductive layer passing through holes formed in the insulative layer and the first conductive layer, and the first conductive layer and the second conductive layer are electrically connected. The detection device executes: a learning step for, in a state in which the cable is tightened by the screw from the top of the second conductive layer and fixed, applying an AC voltage to the first conductive layer and the second conductive layer, measuring a resonance characteristic, and learning, as an initial state, a resonance characteristic in a state in which the screw is tightened; and a detection step for observing fluctuation from the initial state and detecting loosening of the screw.

Effects of the Invention

According to the present invention, it is possible to provide the transducer, the loosening detection system, and the loosening detection method capable of remotely easily detecting that loosening, falling, and the like of screws for fixing a cable have occurred.

DESCRIPTION OF EMBODIMENTS

Embodiments of the present invention are explained in detail below with reference to the drawings. However, it should be noted that the drawings are schematic and relations between thicknesses and plane dimensions of constituent components and the like are different from real ones. It goes without saying that portions having different relations and ratios of dimensions one another are included among a plurality of drawings.

Overview

Transducers, loosening detection systems, and loosening detection methods according to the embodiments of the present invention remotely easily detect that loosening, falling, and the like (hereinafter collectively referred to as "loosening") of screws for fixing a cable have occurred. For example, a sheet is stuck to or paint is applied on a cable in a place desired to be detected and a transducer is formed, an electric signal is fed to the sheet or a coating film, and an electric change amount is acquired. Consequently, it is possible to remotely easily detect a change in an electric characteristic due to loosening of screws and bolts (hereinafter collectively referred to as "screws").

First Embodiment (Overall Configuration of a Loosening Detection System)

Figure 1:
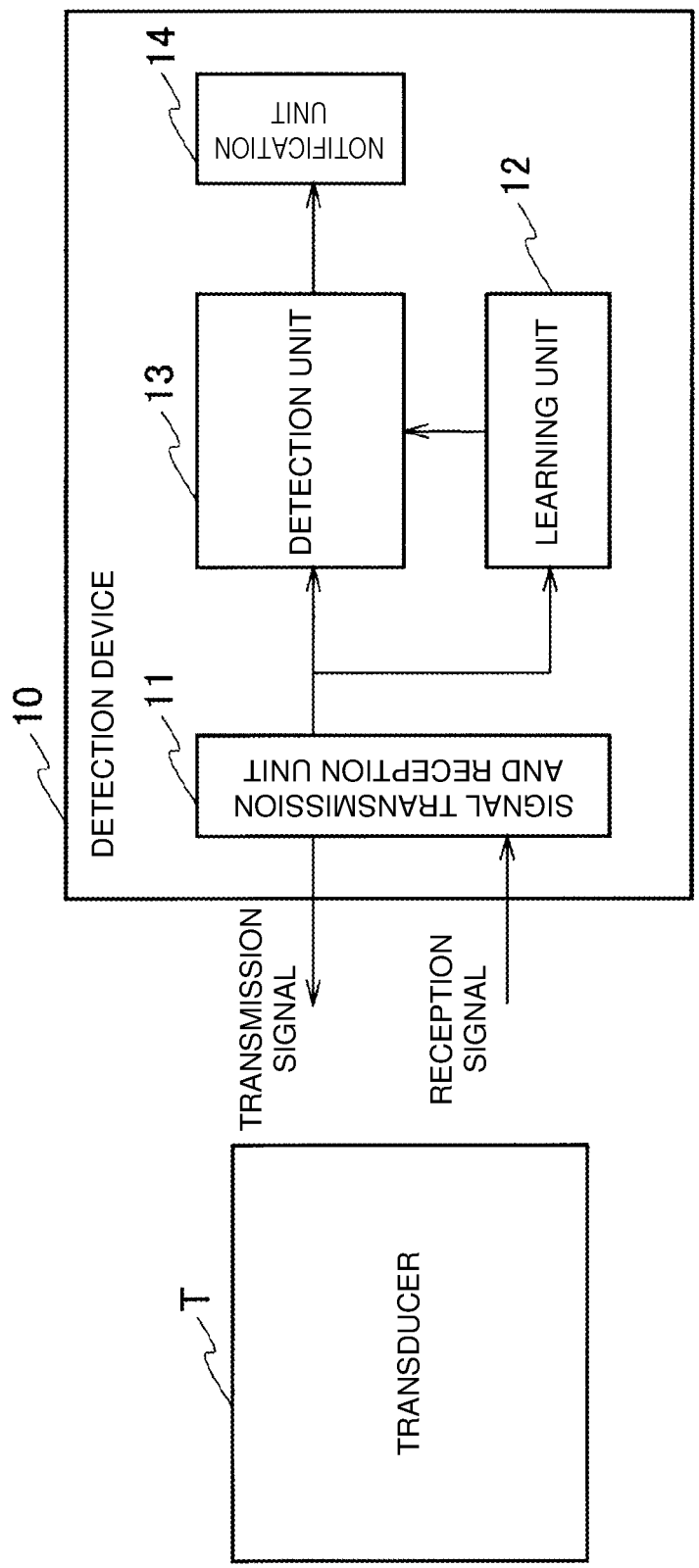
FIG. 1 is a functional block diagram of a loosening detection system according to a first embodiment.

FIG. 1 is a functional block diagram of a loosening detection system according to a first embodiment. The loosening detection system is a system that detects loosening of a scree for fixing a cable and includes a transducer T and a detection device 10. The transducer T is a structure installed on a sheath of the cable. The transducer T is installed on the cable by a method explained below and functions as a sensor for detecting loosening of the screw. The detection device 10 a device that transmits a transmission signal (an electromagnetic wave) to the transducer T, receives a reception signal propagated through the transducer T and returned, and detects loosening of the screw based on a change in the reception signal. The transmission and reception of the signals between the transducer T and the detection device 10 may be wired or may be wireless. A place to which the detection device 10 is installed may be any place where the signals can be transmitted and received to and from the transducer T by wire or wirelessly.

The detection device 10 includes, for example, a signal transmission and reception unit 11, a learning unit 12, a detection unit 13, and a notification unit 14. The signal transmission and reception unit 11 transmits a transmission signal to the transducer T and receives a reception signal returned from the transducer T. The learning unit 12 stores data of a reception signal received when loosening of the screw is absent. The detection unit 13 detects loosening of the screw based on the data stored in the learning unit 12. The notification unit 14 outputs abnormality information when loosening of the screw is detected. These constituent elements may be configured by hardware such as an electronic circuit or may be configured by a software program (explained below).

(Structure of the Transducer)

Figure 2:
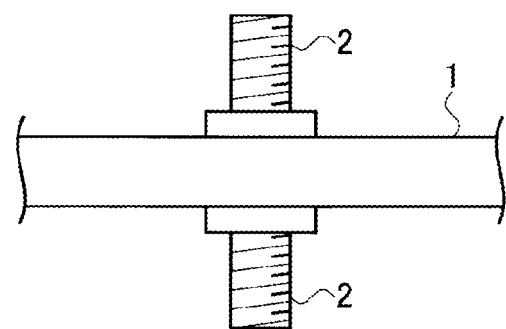
FIG. 2 is a diagram showing a fixing method for a cable according to the first embodiment.

FIG. 2 is a diagram showing a fixing method for a cable 1 according to the first embodiment. The cable 1 such as a normal optical fiber cable is sometimes fixed by tightening the top and the bottom thereof with screws 2 as shown in FIG. 2.

Figure 3:
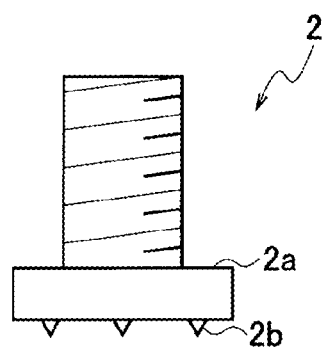
FIG. 3 is an enlarged view of a screw shown in FIG. 2.

FIG. 3 is an enlarged view of the screw 2 shown in FIG. 2. In order to tighten the cable 1, protrusions 2b shown in FIG. 3 are often provided on the screw 2. In the following explanation, it is assumed that the screw 2 is a metal screw. However, the screw 2 may be a resin screw coated with a conductive material.

Figure 4:
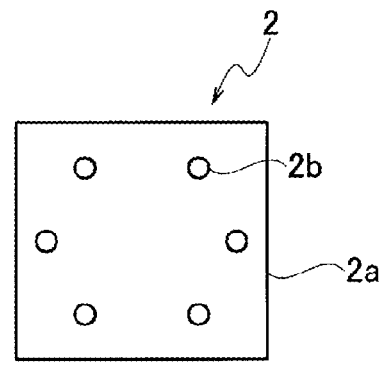
FIG. 4 is a top view of the distal end (a screw head) of the screw shown in FIG. 2.

FIG. 4 is a top view of a distal end (a screw head) 2a of the screw 2 shown in FIG. 2. As shown in FIG. 4, a plurality of protrusions 2b are often provided on the periphery of the screw head 2a. The screw head 2a having a rectangular shape in a top view is illustrated. However, the screw head 2a may have another shape (for example, a hexagonal shape).

Figure 5:
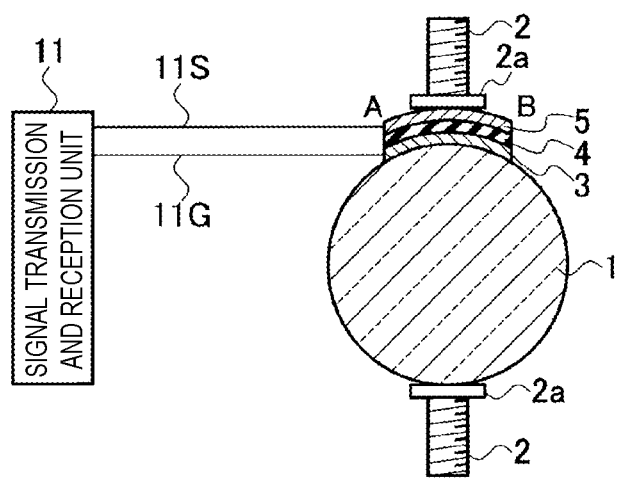
FIG. 5 is a sectional view showing a transducer according to the first embodiment.

FIG. 5 is a sectional view showing an example in which the transducer T according to the first embodiment is installed. Since the cable 1 such as the normal optical fiber cable is insulative, as shown in FIG. 5, a conductive sheet (a first conductive layer) 3 is installed on a first layer of a sheath of the cable 1, an insulative sheet (an insulative layer) 4 is installed on a second layer on the first layer, and a conductive sheet (a second conductive layer) 5 is installed on a third layer on the second layer in this order. The conductive sheet 3, the insulative sheet 4, and the conductive sheet 5 may be a set of sheets or may be respectively superimposed and stuck. Conductive paint and insulative paint having predetermined lengths and thicknesses may be coated on the cable 1 instead of the sheets.

As shown in FIG. 5, the conductive sheet 3, the insulative sheet 4, and the conductive sheet 5 are installed only at the top of the cable 1. The cable 1 is tightened and fixed by two screws 2, one upper and one lower. The conductive sheet 3 is connected to a ground wire 11G, the conductive sheet 5 is connected to a signal wire 11S, and the ground wire 11G and the signal wire 11S are connected to the signal transmission and reception unit 11. In FIG. 5, only the signal transmission and reception unit 11 in the detection device 10 is drawn. However, it goes without saying that the detection device 10 includes other constituent elements. In this way, the transducer T is, for example, a structure having three-layer structure including the conductive sheet 3, the insulative sheet 4, and the conductive sheet 5. In the following explanation, the conductive sheet 3, the insulative sheet 4, and the conductive sheet 5 are sometimes simply referred to as "sheets 3, 4, and 5".

Figure 6:
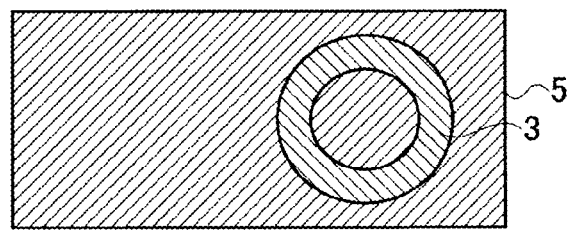
FIG. 6 is a top view of sheets in three-layer structure shown in FIG. 5.
Figure 7:
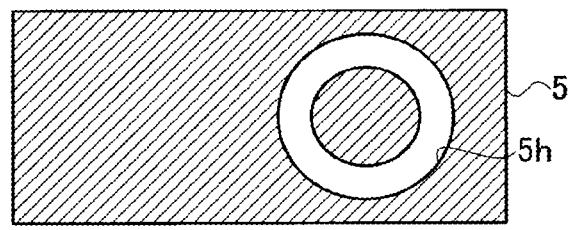
FIG. 7 is a top view of the sheets.
Figure 7:
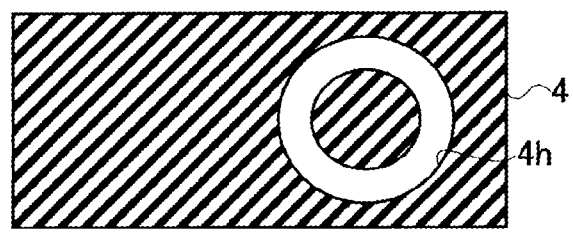
Figure 7:
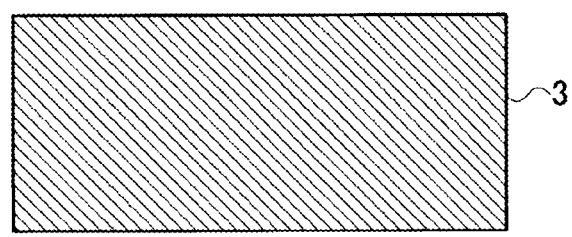

FIG. 6 is a top view of the sheets 3, 4, and 5 in the three-layer structure shown in FIG. 5. FIG. 7 is a top view of the sheets 3, 4, and 5. In an initial state, the conductive sheet 3 in the first layer with which the protrusions 2b of the screw 2 are in contact and the conductive sheet 5 in the third layer with which the screw head 2a of the screw 2 is in contact are in a short-circuited state. To form such an initial state, as shown in FIG. 6 and FIG. 7, in the insulative sheet 4 in the second layer and the conductive sheet 5 in the third layer, doughnut-like holes 4h and 5h are bored in places where the protrusions 2b are likely to be in contact. With such a structure, even if the screw 2 rotates when being tightened, the protrusions 2b can be bit into the conductive sheet 3.

Figure 8:
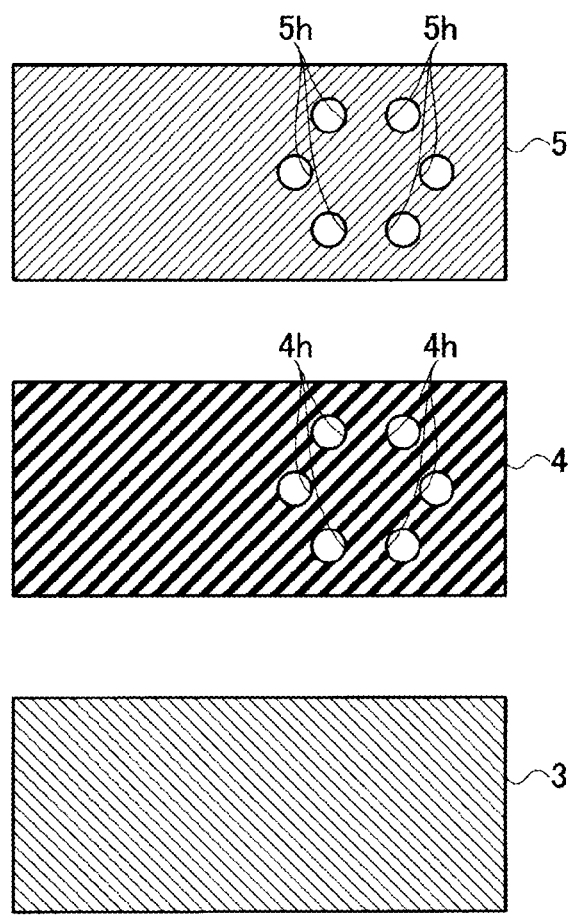
FIG. 8 is a top view showing a modification of the sheets.

FIG. 8 is a top view showing a modification of the sheets 3, 4, and 5. In FIG. 7, the doughnut-like holes 4h and 5h are bored. However, the present invention is not limited to this. That is, in some case, places where the protrusions 2b are in contact with the conductive sheet 3 in the first layer can be accurately predicted in advance. In such a case, as shown in FIG. 8, in the insulative sheet 4 in the second layer and the conductive sheet 5 in the third layer, the same number of holes 4h and 5h may be bored in assumed positions of the protrusions 2b.

Figure 9:
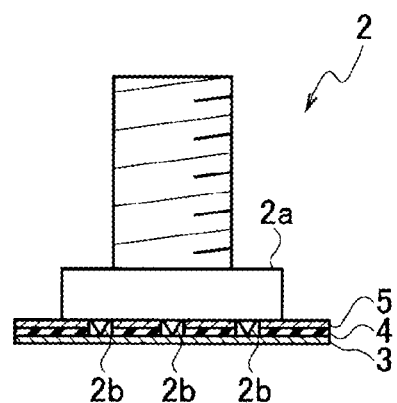
FIG. 9 is a sectional view of the vicinity of a contact section of the screw head.

FIG. 9 is a sectional view (during screw tightening) of the vicinity of a contact section of the screw head 2a in the case in which the sheets 3, 4, and 5 shown in FIG. 8 are installed. When an area for boring the holes 4h and 5h is large, leak of an electromagnetic wave transmitted through the insulative sheet 4 increases. Accordingly, when the area for boring the holes 4h and 5h is reduced as shown in FIG. 8 and FIG. 9, it is possible to reduce the leak of the electromagnetic wave.

(Loosening Detection Method)

Figure 10:
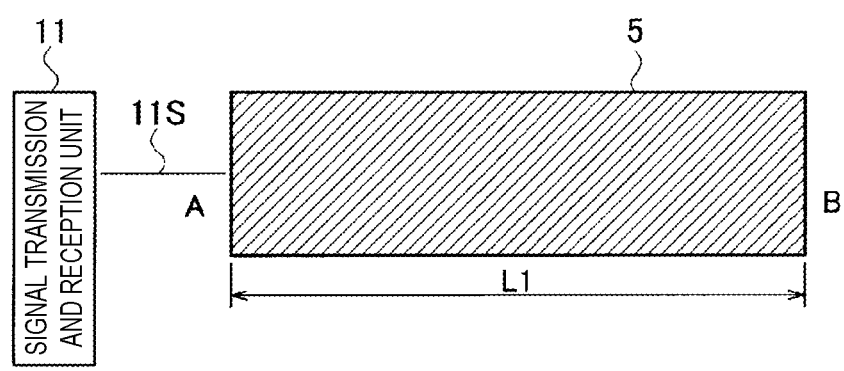
FIG. 10 is a schematic diagram for explaining a loosening detection method according to the first embodiment.

FIG. 10 is a schematic diagram for explaining a loosening detection method according to the first embodiment. Length between both ends (sensor end portions) A and B of the conductive sheet 5 is represented as L1.

In a state in which the screw 2 is fixed to the cable 1 as shown in FIG. 5, when an AC voltage is applied to the conductive sheet 3 and the conductive sheet 5, a resonance characteristic having the length L1 between the sensor end portions A and B as a resonance length is observed as shown in FIG. 10. The lowest frequency of a first harmonic wave α is a frequency resonating at λ/4 in the length L1 because the contact section of the screw head 2a (the sensor end portion B in the case of FIG. 10) is a node of an electromagnetic wave and the opposite side is an antinode of the electronic wave (the sensor end portion A in the case of FIG. 10). λ is a wavelength in a medium. A second harmonic wave β is a frequency resonating at 3/4λ in L1 set to odd number times of λ/4. In this way, resonance occurs at the frequency in L1 set to odd number times of λ/4. The position of the short-circuit is not strictly the sensor end portion B. Since conditions are different in a contact position of the screw head 2a and wavelengths, in actual operation, the initial state is learned once by the learning unit 12 or is predicted by a simulation. It is conceived that the initial state changes to a state (c) in which the screw 2 is completely loosened through a process of transition states (a) and (b) described below.

(a) A state in which the screw 2 is physically in contact with the sensor surface but an effective contact area decreases because the screw 2 is slightly loosened.

(b) A state in which a part of the protrusions 2b of the screw 2 are in contact with the sensor surface and the screw 2 is not completely separated from the sensor surface.

(c) A state in which the screw 2 is completely separated from the sensor surface (electrically opened) and is not physically in contact with the sensor surface. A clearly abnormal state.

It is preferable that the transition process of the states (a) to (c) is defined by an expression described below and thresholds can be set. The setting of the thresholds cannot be clearly defined because the setting of the thresholds depends on the structure of the sensor, the material (a surface roughness state and an oxide film state), and the like. Therefore, an idea is explained below.

$$\Delta f = (fm - fs)/(fo - fs)$$

Δf: a frequency shift amount fm: a peak of a measured frequency fs: a frequency in a short-circuit state (a sound state)

fo: a frequency in an open state (a clearly abnormal state)

Detection methods in the states are explained in the order of the states (c), (b), and (a).

First, the detection method in the state (c) is explained. The state (c) is a state in which the screw 2 is completely separated from the sensor surface (electrically opened) and is not physically in contact with the sensor surface. That is, the state (c) is equivalent to the time of Δf≡1 (fm=fo) in the above expression.

Figure 11:
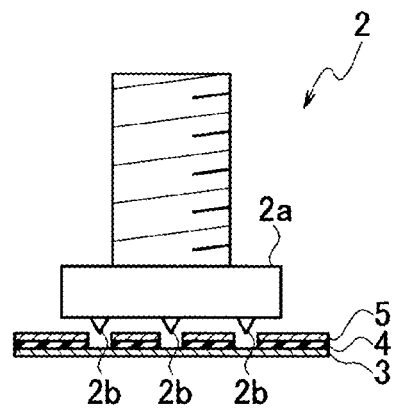
FIG. 11 is a sectional view of the vicinity of the contact section of the screw head in a state in which the screw is loosened.

FIG. 11 is a sectional view of the vicinity of the contact section of the screw head 2a in a state in which the fixed screw 2 is loosened. As shown in FIG. 11, when the screw 2 is loosened, the conductive sheet 3 and the protrusions 2b of the screw 2 are not in contact. Therefore, the electrically short-circuited state changes to an electrically open state. Consequently, both of the sensor end portions A and B shown in FIG. 10 change to open ends. Therefore, a frequency characteristic of a resonance condition in L1 set to integer times of λ/2 is obtained. By monitoring a change in the resonance frequency in this way, it is possible to detect loosening of the screw 2.

Figure 12:
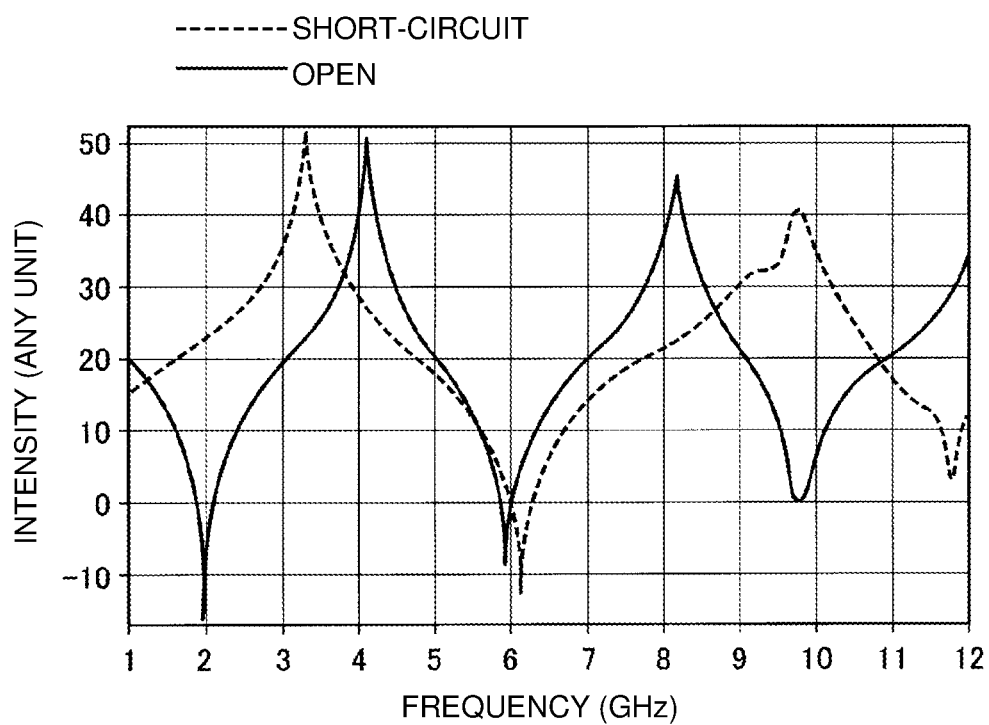
FIG. 12 is a graph showing an example of a monitoring result.

FIG. 12 is a graph showing an example of a result of the monitoring. A case in which the screw 2 is installed in a position where λs/4>λo/4 is illustrated. When loosening of one screw 2 is monitored, if the screw 2 is installed in the center of the sensor (the transducer T), since the center is a short-circuit position, resonance occurs at integer times of λ/2 when the screw 2 is loosened and when the screw 2 is fixed. Therefore, the screw is desirably installed in a position other than the center of the sensor.

Subsequently, a detection method in the state (b) is explained. The state (b) is a state in which a part of the protrusions 2b of the screw 2 are in contact with the sensor surface and the screw 2 is not completely separated from the sensor surface. That is, the state (b) is equivalent to the time of $\Delta f < -f1$ (fm=fs', fs': a part of the protrusions 2b are in contact with the sensor surface) in the above expression.

Figure 13:
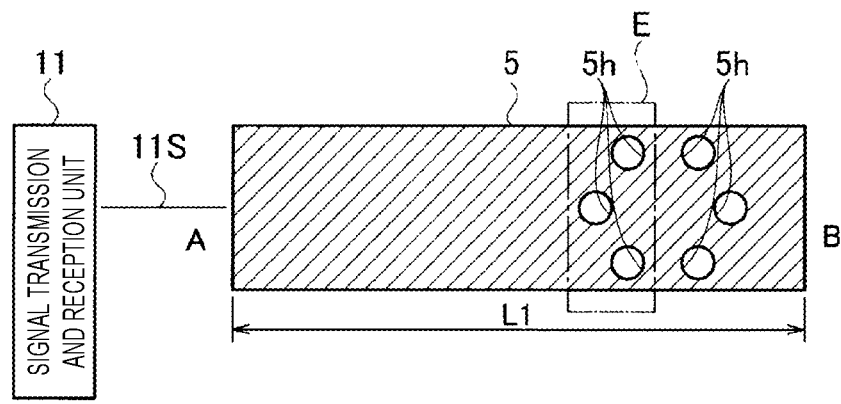
FIG. 13 is a schematic diagram for explaining a positional relation between a power feeding point of a sensor and protrusions.

FIG. 13 is a schematic diagram for explaining a positional relation between a power feeding point (the sensor end portion A) of the sensor and the protrusions 2b. That is, there is a state in which a part of the protrusions 2b of the screw 2 are in contact with the sensor and a part of the protrusions 2b are not in contact with the sensor. As shown in FIG. 13, in particular, when the protrusions 2b on the sensor end portion A side, which is the power feeding point side, (the protrusions 2b in a rectangle E) are separated from the sensor surface, electric field intensity in that position rises. Accordingly, a short-circuit position of an electric field distribution conspicuously moves in an end face direction of the sensor end portion B and a resonance length increases. Therefore, a wavelength shifts to a low frequency side. It is also possible to detect a loosening state of the screw 2 by grasping a peak shift of a resonance frequency in this way.

Figure 14:
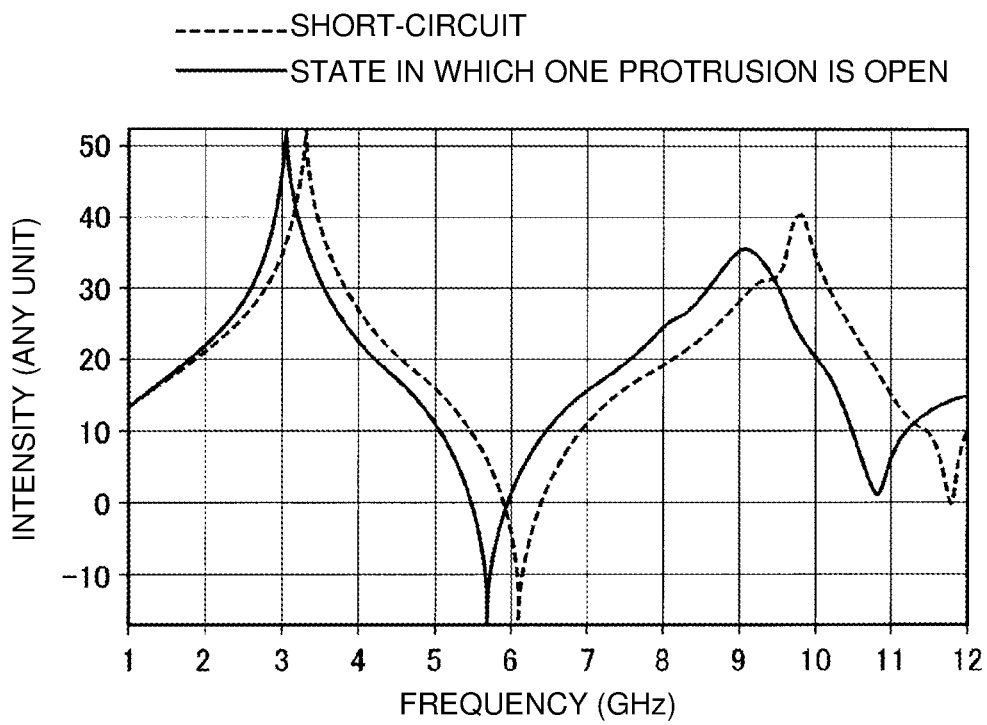
FIG. 14 is a graph showing an example of a monitoring result.

FIG. 14 is a graph showing an example of the monitoring result. As shown in FIG. 14, in the state (b), the wavelength increases and the frequency shifts to a low frequency. However, the frequency is less easily affected when the protrusions 2b on the sensor end portion B side, which is the opposite side of the power feeding point, are not in contact with the sensor surface. f1 is defined according to the structures of the sensor and the screw 2 and detection sensitivity.

Subsequently, a detection method in the state (a) is explained. The state (a) is a nearly sound loosened state. That is, the state (a) is equivalent to the time of $-f1 < \Delta f < f1$ (fm≡fs) in the above expression.

Figure 15:
FIG. 15 is an enlarged view of a contact surface of a sensor surface and the protrusion.

FIG. 15 is an enlarged view of a contact surface of the sensor surface and the protrusion 2b. In general, it can be conceived that, in a material, there is an effective conduction area of electric conduction in an apparent contact surface because of the influence of surface roughness and the influence of an oxide film on a metal surface. That is, when the contact surface of the sensor surface and the protrusion 2b is enlarged, as shown in FIG. 15, since the contact surface is actually uneven, there are portions where the material is in contact and portions where the material is not in contact. When the screw 2 is slightly loosened, since the apparent contact area decreases, contact resistance increases. It is possible to detect loosening of the screw 2 from such a difference in a contact degree of the protrusion 2b and the sensor.

Figure 16:
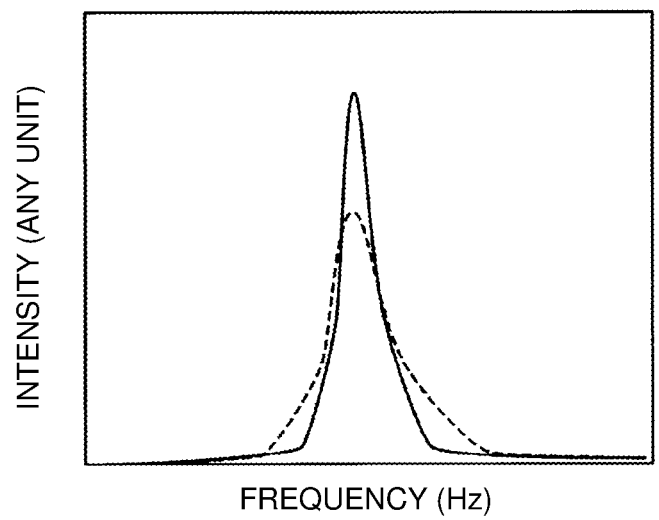
FIG. 16 is a graph showing an example of a monitoring result.
Figure 17:
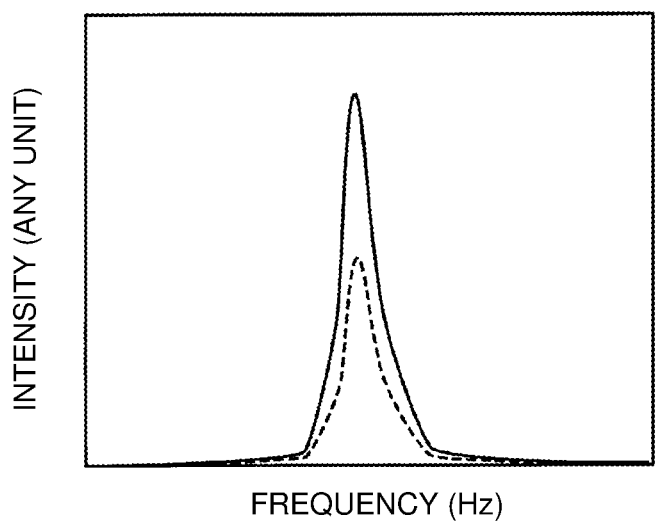
FIG. 17 is a graph showing an example of a monitoring result.

FIG. 16 and FIG. 17 are graphs showing examples of the monitoring result. When the contact resistance changes because the apparent contact area decreases, as shown in FIG. 16, a Q value of a resonance frequency decreases. Therefore, loosening of the screw 2 may be detected using the change. When the contact resistance changes because the apparent contact area decreases, as shown in FIG. 17, a loss increases and a reflection signal of a frequency characteristic decreases. Therefore, loosening of the screw 2 may be detected using a change in an absolute value of a signal.

(Operation of the Detection Device)

Figure 18:
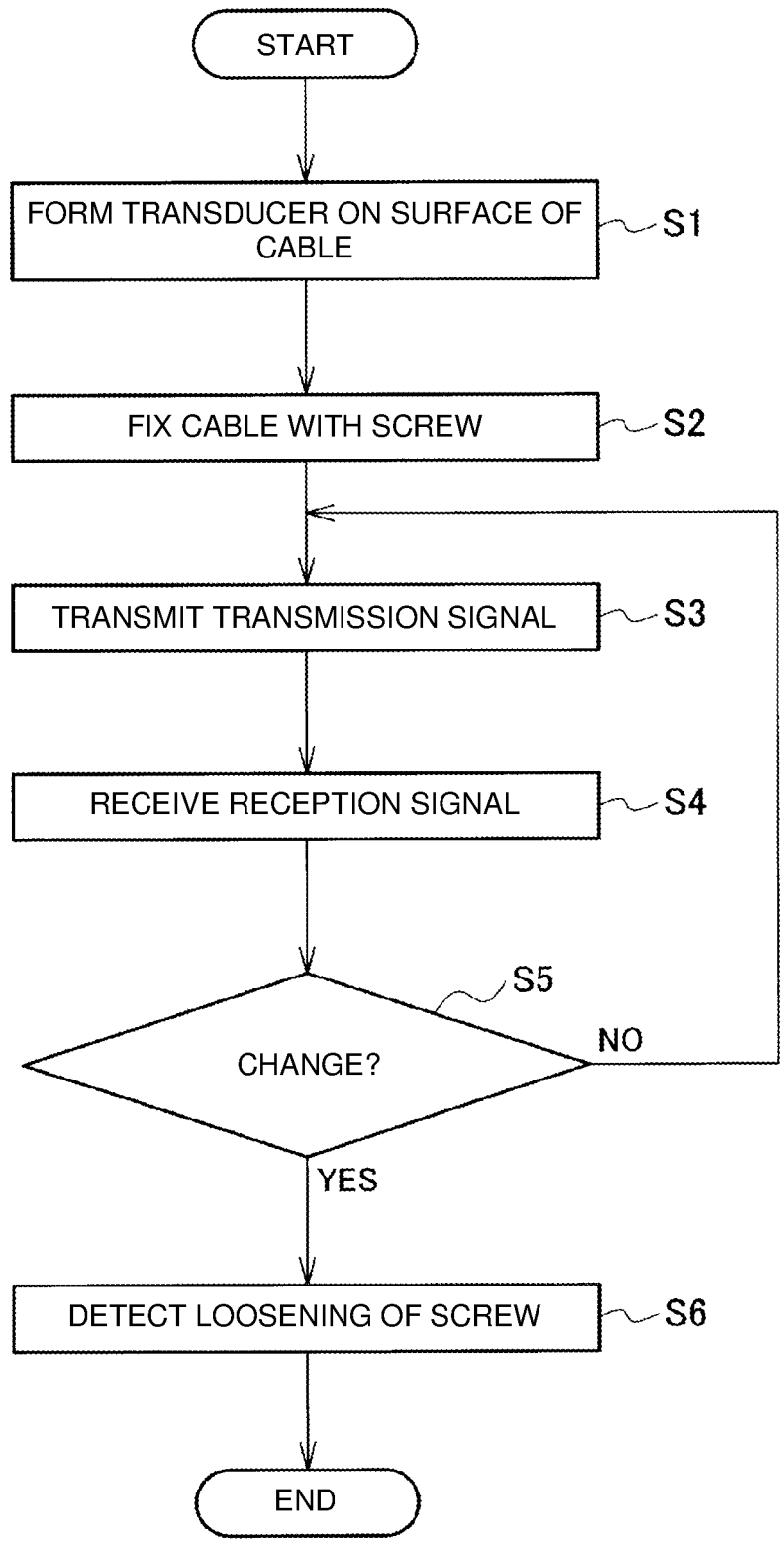
FIG. 18 is a flowchart showing the operation of a detection device.

FIG. 18 is a flowchart showing the operation of the detection device 10. It is assumed that the transducer T is installed on the surface (the sheath) of the cable 1 and the cable is tightened and fixed by the screw 2 (steps S1 to S2). The detection device 10 transmits a transmission signal to the transducer T, receives a reception signal propagated through the transducer T and returned, and detects loosening of the screw 2 based on a change in the reception signal (steps S3 to S6). Specifically, in a state in which the cable 1 is tightened by the screw 2 from the top of the conductive sheet 5 and fixed, an AC voltage is applied to the conductive sheet 3 and the conductive sheet 5 and a resonance characteristic is measured, a resonance characteristic in a state in which the screw 2 is tightened is learned as an initial state, and fluctuation from the initial state is observed and loosening of the screw 2 is detected. When loosening of the screw 2 is detected, it is also possible to notify an external system.

As explained above, according to the present invention, it is possible to provide the transducer, the loosening detection system, and the loosening detection method suitable for inspecting loosing and falling of the screw 2 that cause falling of a cable 1. The protrusions 2b of the screw 2 is used. However, the present invention can also be applied to the screw 2 without the protrusions 2b if the same fixing method is used for the screw 2.

Second Embodiment

In the first embodiment, the case in which loosening of one screw 2 is detected is explained. In a second embodiment, a case in which loosening of two screws 2 is detected is explained. In the following explanation, differences from the first embodiment are mainly explained. Detailed explanation is omitted about similarities to the first embodiment.

Figure 19:
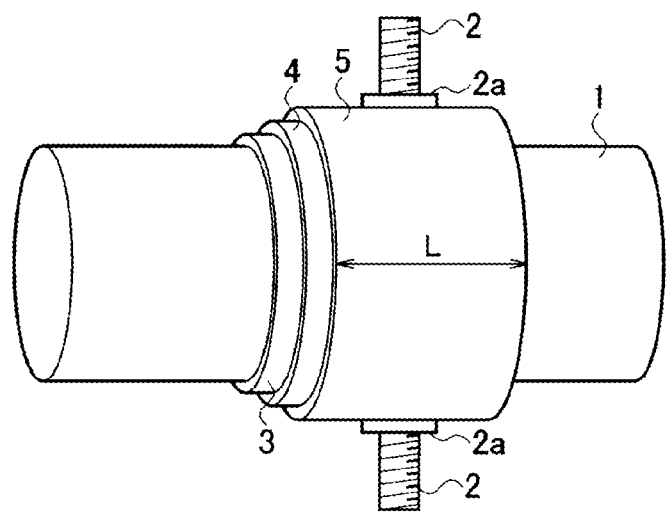
FIG. 19 is a perspective view showing a transducer according to a second embodiment.

FIG. 19 is a perspective view showing an example in which the transducer T according to the second embodiment is installed. As in the first embodiment, the conductive sheet 3 is installed in the first layer of the sheath of the cable 1, the insulative sheet 4 is installed in the second layer on the first layer, and the conductive sheet 5 is installed in the third layer on the second layer in this order. In FIG. 19, for clear explanation, the sheets 3, 4, and 5 are shown at different heights. However, actually, it is unnecessary to construct the sheets 3, 4, and 5 at different heights. Sheets of the same size may be used as the sheets 3, 4, and 5.

Figure 20:
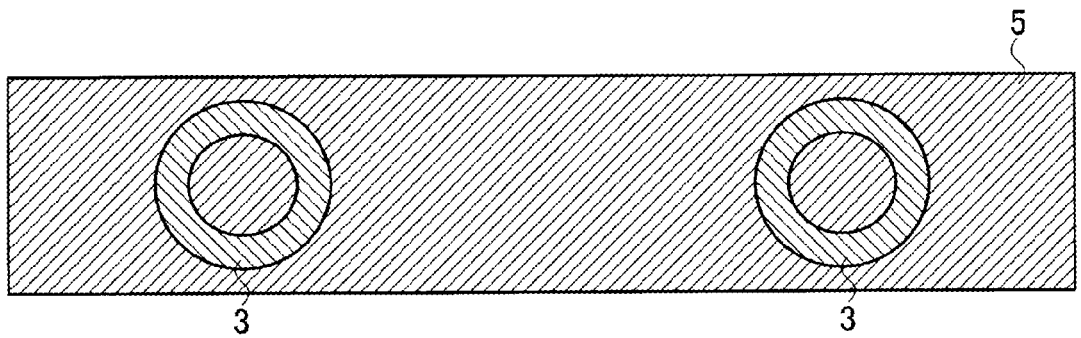
FIG. 20 is a top view of sheets in three-layer structure shown in FIG. 19.
Figure 21:
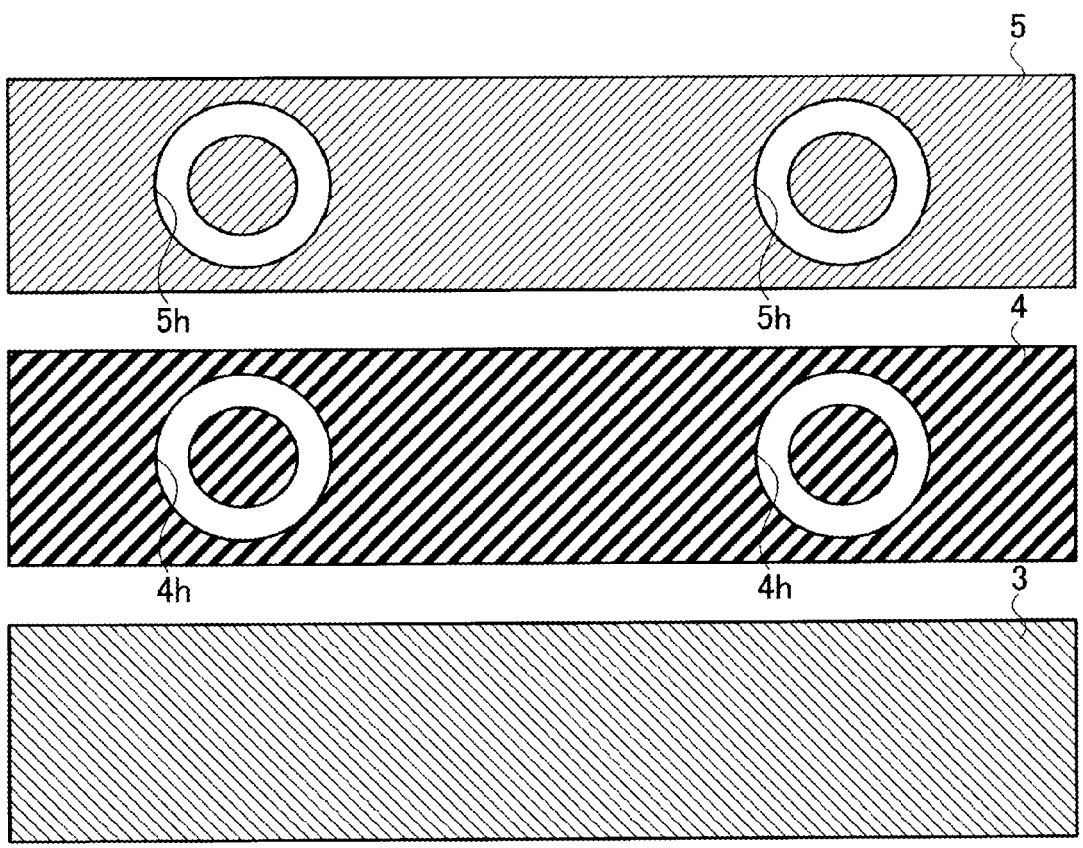
FIG. 21 is a top view of the sheets.

FIG. 20 is a top view of the sheets 3, 4, and 5 in three-layer structure shown in FIG. 19. FIG. 21 is a top view of the sheets 3, 4, and 5. As shown in FIG. 20 and FIG. 21, in the insulative sheet 4 in the second layer and the conductive sheet 5 in the third layer, the doughnut-like holes 4h and 5h are respectively bored in places where the protrusions 2b of the two screws 2 are likely to be in contact.

Figure 22:
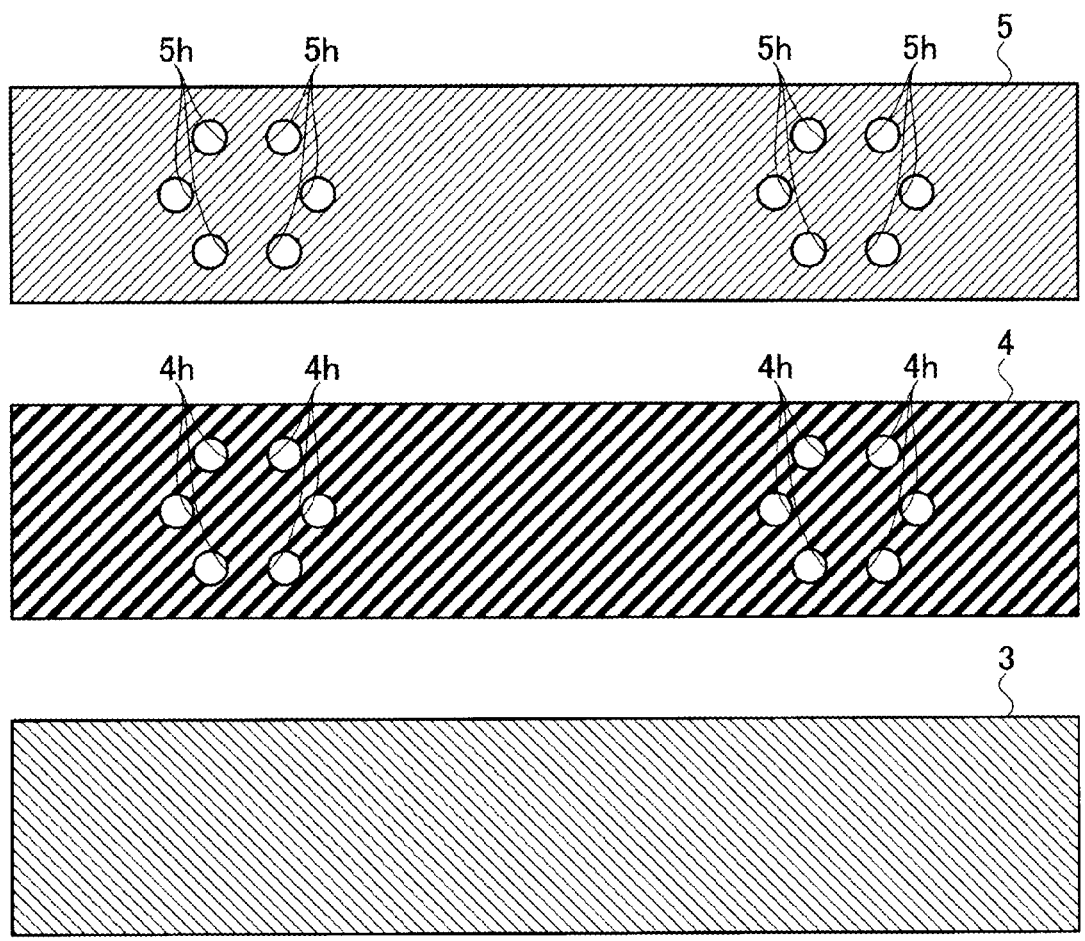
FIG. 22 is a top view showing a modification of the sheets.

FIG. 22 is a top view showing a modification of the sheets 3, 4, and 5. As in the first embodiment, as shown in FIG. 22, in the insulative sheet 4 in the second layer and the conductive sheet 5 in the third layer, the same number of holes 4h and 5h may be bored in assumed positions of the protrusions 2b.

Figure 23:
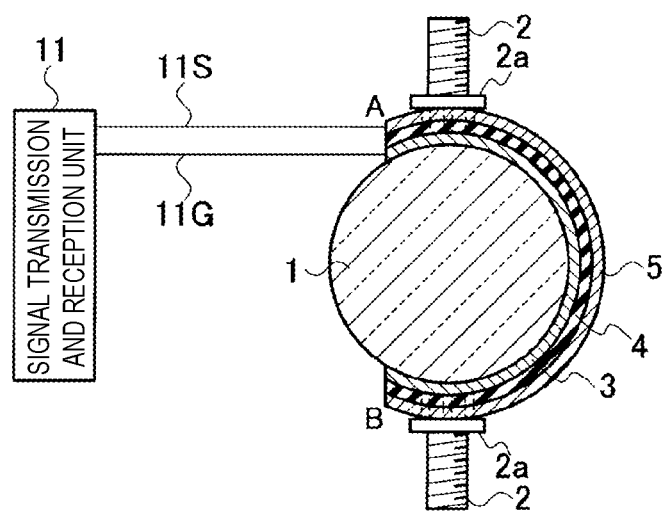
FIG. 23 is a sectional view showing the transducer shown in FIG. 21.
Figure 24:
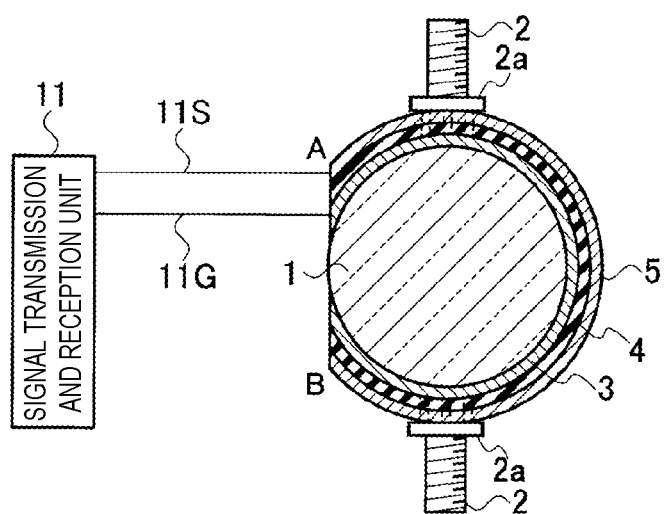
FIG. 24 is a sectional view showing the transducer shown in FIG. 21.

FIG. 23 and FIG. 24 are sectional views showing an example in which the transducer T shown in FIG. 21 is installed. As shown in FIG. 23, the sheets 3, 4, and 5 in the three-layer structure may cover approximately a half circumference of the cable 1. Alternatively, as shown in FIG. 24, the sheets 3, 4, and 5 in the three-layer structure may cover substantially the entire circumference of the cable 1. However, the screws 2 desired to be detected need to be installed to be in contact with the sheets 3 and 5.

Figure 25:
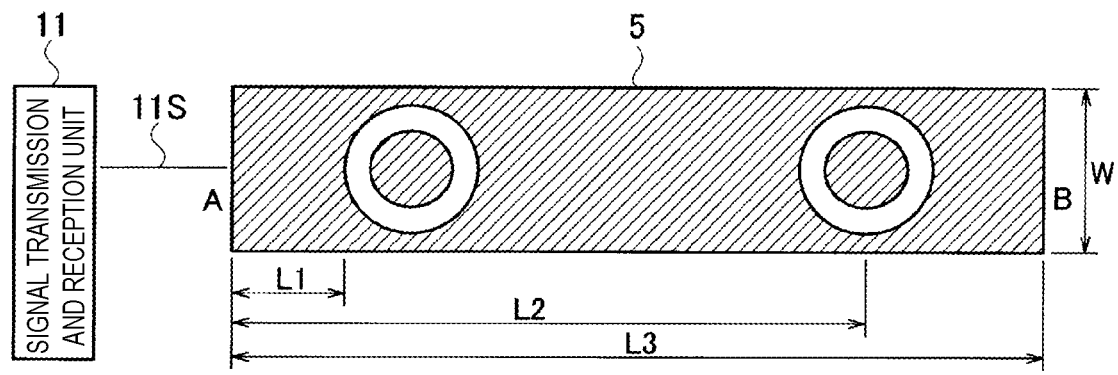
FIG. 25 is a schematic diagram for explaining a loosening detection method according to the second embodiment.

FIG. 25 is a schematic diagram for explaining a loosening detection method according to the second embodiment. The length between the sensor end portions A and B is represented as L3 and a sensor width is represented as W.

Figure 26:
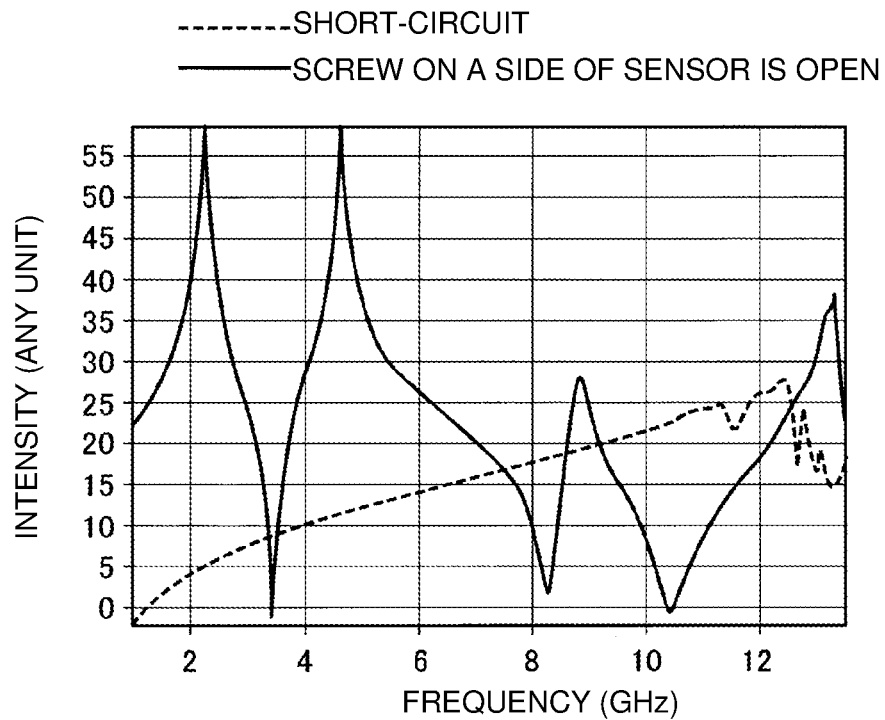
FIG. 26 is a graph showing an example of a monitoring result.

First, a method of detecting loosening of the screw 2 on the sensor end portion A side is explained. In a state in which the screw 2 is fixed to the cable 1 as shown in FIG. 23, when an AC voltage is applied to the conductive sheet 3 and the conductive sheet 5, a resonance characteristic of the sensor is observed. As the resonance characteristic, a resonance characteristic (resonating at odd number times of $\lambda/4$ in L1 shown in FIG. 25) having the power feeding point as an opening end and having the screw 2 on the power feeding point side (the sensor end portion A side) as a short-circuit end is basically observed. However, since a resonance mode is complicated when a plurality of screws 2 are installed, a peak of a resonance mode other than this is also observed. A resonance mode changes according to accurate positions of the protrusions 2b and the area and the shape of a bored sensor. Therefore, a basic resonance peak deviates compared with a sensor having a simple planar shape. When the screw 2 on the sensor end portion A side is loosened, a resonance characteristic (resonating at odd number times of $\lambda/4$ in L2 shown in FIG. 25) having the power feeding point as an open end and having the screw 2 on the sensor end portion B side as a short-circuit end is observed. Since a resonance condition changes in this way, it is possible to detect loosening of the screw 2 on the sensor end portion A side (see FIG. 26).

Subsequently, a method of detecting loosening of the screw 2 on the sensor end portion B side is explained. A resonance state in an initial state in which the screw 2 is fixed is based on the length L1. However, compared with the case of detection of loosening of one screw 2, it is difficult to set the length L1 large. Therefore, in the second embodiment, the length L1 in the longitudinal direction of the conductive sheet 5 is small compared with the first embodiment. The length L1 is large with respect to the sensor width W. Therefore, in a distribution in the initial state, a resonance characteristic by a two-dimensional distribution in the sensor longitudinal direction and the sensor width direction is strictly observed. Accordingly, when the screw 2 on the sensor end portion B side is loosened, since electric field intensity around the screw 2 rises, the resonance characteristic changes. Consequently, it is possible to detect loosening of the screw 2 on the sensor end portion B side as well.

Figure 27:
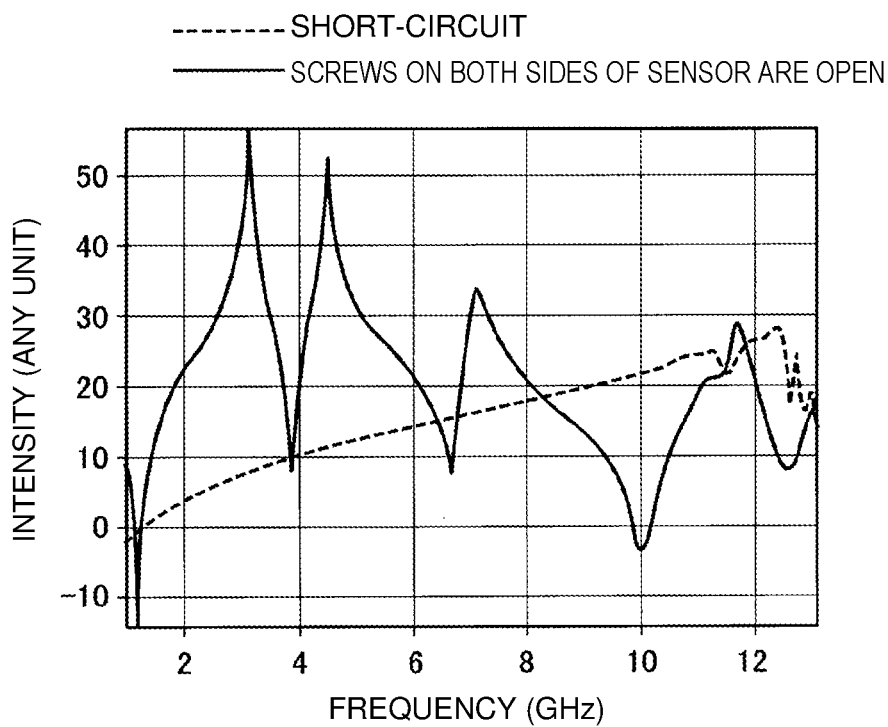
FIG. 27 is a graph showing an example of a monitoring result.

In a state in which the screws 2 on both the sensor end portions A and B sides are loosened, a state in which screw portions are short-circuited changes to a resonance characteristic (resonating at integer times of $\lambda/2$ in L3 shown in FIG. 25) in which end faces on both the sides are open ends. Therefore, it is possible to detect loosening of the screws 2 using the change in the resonance characteristic (see FIG. 27).

(Hardware Configuration Example of the Detection Device)

Figure 28:
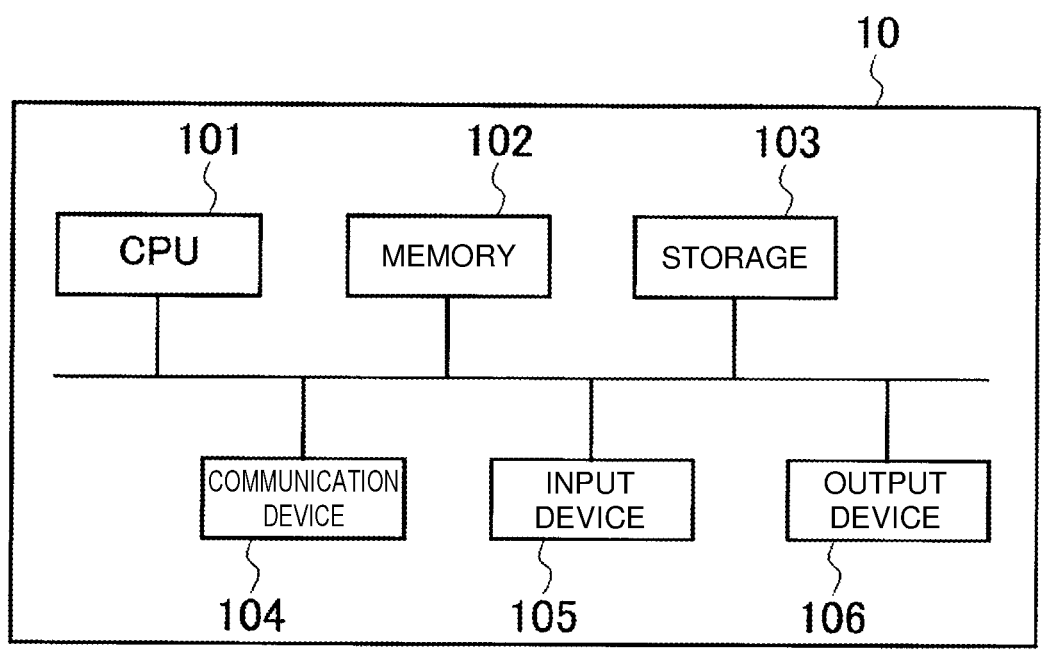
FIG. 28 is a hardware configuration diagram of a detection device.

FIG. 28 is a hardware configuration example of the detection device 10. As the detection device 10, for example, a general-purpose computer system including a CPU (Central Processing Unit, a processor) 101, a memory 102, a storage 103 (HDD: Hard Disk Drive, SSD: Solid State Drive), a communication device 104, an input device 105, and an output device 106 can be used. The memory 102 and the storage 103 are storage devices. In the computer system, the CPU 101 executes a predetermined program loaded on the memory 102, whereby functions of the detection device 10 are realized.

Note that the detection device 10 may be implemented by one computer or may be implemented by a plurality of computers. The detection device 10 may be a virtual machine implemented in a computer. A program for detection can be stored in a computer-readable recording medium such as a HDD, an SSD, a USB (Universal Serial Bus) memory, a CD (Compact Disc), or a DVD (Digital Versatile Disc) or can be distributed via a network.

(Characteristic Configuration and Effects Thereof)

As explained above, the transducer T according to the embodiments of the present invention includes the conductive sheet 3 installed on the sheath of the cable 1, the insulative sheet 4 installed on the conductive sheet 3, the holes 4h being formed in predetermined positions of the insulative sheet 4, and the conductive sheet 5 installed on the insulative sheet 4, the holes 5h being formed in predetermined positions of the conductive sheet 5. The transducer T has structure in which, when the cable 1 is tightened by the screw 2 from the top of the conductive sheet 5 and fixed, the distal end of the screw 2 comes into contact with the conductive sheet 3 passing through the holes 4h and 5h formed in the insulative sheet 4 and the conductive sheet 3, and the conductive sheet 3 and the conductive sheet 5 are electrically connected. Consequently, it is possible to provide the transducer T capable of remotely easily detecting that loosening, falling, and the like of the screw 2 for fixing the cable 1 have occurred.

Specifically, a plurality of protrusions 2b may be formed at the distal end of the screw 2, and the holes 4h and 5h through which the plurality of protrusions 2b pass may be annularly formed in the insulative sheet 4 and the conductive sheet 5. With such structure, even if the screw 2 rotates when being tightened, the protrusions 2b can be bit into the conductive sheet 3.

A plurality of protrusions 2b may be formed at the distal end of the screw 2, and the same number of holes 4h and 5h through which the plurality of protrusions 2b respectively pass may be formed in the insulative sheet 4 and the conductive sheet 5. With such structure, since an area for boring the holes 4h and 5h decreases, it is possible to reduce leak of an electromagnetic wave.

The screw 2 may be installed in a position other than the center of the transducer T. Consequently, it is possible to accurately detect loosening of the screw 2.

When the cable 1 is tightened by two screws 2 from the top of the conductive sheet 5 and fixed, the distal ends of the two screws 2 may pass through the holes 4h and 5h formed in the insulative sheet 4 and the conductive sheet 5. Consequently, when the cable 1 is tightened by the two screws 2 from the top and the bottom of the cable 1 and fixed, it is possible to detect loosening of the two screws 2.

A loosening detection system according to an embodiment of the present invention is a system including the transducer T and the detection device 10 that detects loosening of the screw 2 using the transducer T. The transducer T includes the conductive sheet 3 installed on the sheath of the cable 1, the insulative sheet 4 installed on the conductive sheet 3, the holes 4h being formed in predetermined positions of the insulative sheet 4, and the conductive sheet 5 installed on the insulative sheet 4, the holes 5h being formed in predetermined positions of the conductive sheet 5. The transducer T has structure in which, when the cable 1 is tightened by the screw 2 from the top of the conductive sheet 5 and fixed, the distal end of the screw 2 comes into contact with the conductive sheet 3 passing through the holes 4h and 5h formed in the insulative sheet 4 and the conductive sheet 3, and the conductive sheet 3 and the conductive sheet 5 are electrically connected. The detection device 10 includes the learning unit 12 that, in a state in which the cable 1 is tightened by the screw 2 from the top of the conductive sheet 5 and fixed, applies an AC voltage to the conductive sheet 3 and the conductive sheet 5, measures a resonance characteristic, and learns, as an initial state, a resonance characteristic in a state in which the screw 2 is tightened and the detection unit 13 that observes fluctuation from the initial state and detects loosening of the screw 2. Consequently, it is possible to provide the loosening detection system capable of remotely easily detecting that loosening, falling, and the like of the screw 2 for fixing the cable 1 have occurred.

A loosening detection method according to an embodiment of the present invention is a method in which the detection device 10 detects loosening of the screw 2 using the transducer T. The transducer T includes the conductive sheet 3 installed on the sheath of the cable 1, the insulative sheet 4 installed on the conductive sheet 3, the holes 4h being formed in predetermined positions of the insulative sheet 4, and the conductive sheet 5 installed on the insulative sheet 4, the holes 5h being formed in predetermined positions of the conductive sheet 5. The transducer T has structure in which, when the cable 1 is tightened by the screw 2 from the top of the conductive sheet 5 and fixed, the distal end of the screw 2 comes into contact with the conductive sheet 3 passing through the holes 4h and 5h formed in the insulative sheet 4 and the conductive sheet 5, and the conductive sheet 3 and the conductive sheet 5 are electrically connected. The detection device 10 executes a learning step for, in a state in which the cable 1 is tightened by the screw 2 from the top of the conductive sheet 5 and fixed, applying an AC voltage to the conductive sheet 3 and the conductive sheet 5, measuring a resonance characteristic, and learning, as an initial state, a resonance characteristic in a state in which the screw 2 is tightened and a detection step of observing fluctuation from the initial state and detecting loosening of the screw 2. Consequently, it is possible to provide the loosening detection method capable of remotely easily detecting that loosening, falling, and the like of the screw 2 for fixing the cable 1 have occurred.

Other Embodiments

As explained above, the several embodiments are described. However, the statements and the drawings forming a part of the disclosure are illustrative and should not be understood as limiting. Various substitutive embodiments, examples, and operation techniques will be obvious for those skilled in the art from the disclosure. Embodiments of the present invention include various embodiments and the like not described herein.

REFERENCE SIGNS LIST

1 cable
2 screw
2a screw head
2b protrusion
3 conductive sheet (first conductive layer)
4 insulative sheet (insulative layer)
4h hole
5 conductive sheet (second conductive layer)
5h hole
10 detection device
11 signal transmission and reception unit
12 learning unit
13 detection unit
14 notification unit
T transducer

The invention claimed is:

1. A transducer comprising:
a first conductive layer installed on a sheath of a cable;
an insulative layer installed on the first conductive layer, a hole being formed in a predetermined position of the insulative layer; and
a second conductive layer installed on the insulative layer, a hole being formed in a predetermined position of the second conductive layer,
the transducer having structure in which, when the cable is tightened by a screw from a top of the second conductive layer and fixed, the distal end of the screw comes into contact with the first conductive layer passing through holes formed in the insulative layer and the second conductive layer, and the first conductive layer and the second conductive layer are electrically connected.

2. The transducer according to claim 1, wherein
a plurality of protrusions are formed at a distal end of the screw, and
holes through which the plurality of protrusions pass are annularly formed in the insulative layer and the second conductive layer.

3. The transducer according to claim 2, wherein the screw is installed in a position other than a center of the transducer.

4. The transducer according to claim 2, wherein, when the cable is tightened by two of the screws from a top of the second conductive layer and fixed, distal ends of the two screws pass through holes formed in the insulative layer and the first conductive layer.

5. The transducer according to claim 1, wherein
a plurality of protrusions are formed at a distal end of the screw, and
a same number of holes through which the plurality of protrusions respectively pass are formed in the insulative layer and the second conductive layer.

6. The transducer according to claim 5, wherein the screw is installed in a position other than a center of the transducer.

7. The transducer according to claim 5, wherein, when the cable is tightened by two of the screws from a top of the second conductive layer and fixed, distal ends of the two screws pass through holes formed in the insulative layer and the first conductive layer.

8. The transducer according to claim 1, wherein the screw is installed in a position other than a center of the transducer.

9. The transducer according to claim 8, wherein, when the cable is tightened by two of the screws from a top of the second conductive layer and fixed, distal ends of the two screws pass through holes formed in the insulative layer and the first conductive layer.

10. The transducer according to claim 1, wherein, when the cable is tightened by two of the screws from a top of the second conductive layer and fixed, distal ends of the two screws pass through holes formed in the insulative layer and the first conductive layer.

11. A loosening detection system comprising:
a transducer; and
a detection device that detects loosening of a screw using the transducer, the transducer including:
  a first conductive layer installed on a sheath of a cable;
  an insulative layer installed on the first conductive layer, a hole being formed in a predetermined position of the insulative layer; and
  a second conductive layer installed on the insulative layer, a hole being formed in a predetermined position of the second conductive layer,
the transducer having a structure in which, when the cable is tightened by the screw from a top of the second conductive layer and fixed, the distal end of the screw comes into contact with the first conductive layer passing through holes formed in the insulative layer and the second conductive layer, and the first conductive layer and the second conductive layer are electrically connected,
the detection device including:
  a learning unit that, in a state in which the cable is tightened by the screw from the top of the second conductive layer and fixed, applies an AC voltage to the first conductive layer and the second conductive layer, measures a resonance characteristic, and learns, as an initial state, a resonance characteristic in a state in which the screw is tightened; and
  a detection unit that observes fluctuation from the initial state and detects loosening of the screw.

12. A loosening detection method in which a detection device detects loosening of a screw using a transducer, the transducer including:
  a first conductive layer installed on a sheath of a cable;
  an insulative layer installed on the first conductive layer, a hole being formed in a predetermined position of the insulative layer; and
  a second conductive layer installed on the insulative layer, a hole being formed in a predetermined position of the second conductive layer,
the transducer having a structure in which, when the cable is tightened by the screw from a top of the second conductive layer and fixed, the distal end of the screw comes into contact with the first conductive layer passing through holes formed in the insulative layer and the second conductive layer, and the first conductive layer and the second conductive layer are electrically connected,
the detection device executing:
  a learning step for, in a state in which the cable is tightened by the screw from the top of the second conductive layer and fixed, applying an AC voltage to the first conductive layer and the second conductive layer, measuring a resonance characteristic, and learning, as an initial state, a resonance characteristic in a state in which the screw is tightened; and
  a detection step for observing fluctuation from the initial state and detecting loosening of the screw.

* * * * *